(12) United States Patent
Shigekusa et al.

(10) Patent No.: US 6,394,349 B1
(45) Date of Patent: May 28, 2002

(54) OPTICAL INFORMATION READER AND RECORDING MEDIUM

(75) Inventors: Hisashi Shigekusa, Okazaki; Tadao Nojiri, Obu, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/154,587

(22) Filed: Sep. 17, 1998

(30) Foreign Application Priority Data

Oct. 15, 1997 (JP) ............................................. 9-282031

(51) Int. Cl.[7] ................................................ G06K 7/14
(52) U.S. Cl. ............. 235/454; 235/462.06; 235/462.12
(58) Field of Search ....................... 235/462.06, 462.42, 235/454, 462.12, 462.36

(56) References Cited

U.S. PATENT DOCUMENTS

| | | | | |
|---|---|---|---|---|
| 3,812,325 A | * | 5/1974 | Scmidt ................. 235/61.11 E |
| 3,812,374 A | * | 5/1974 | Tuhro ......................... 250/568 |
| 4,508,453 A | * | 4/1985 | Hara et al. .................. 356/394 |
| 4,654,583 A | | 3/1987 | Ninomiya et al. |
| 4,882,476 A | * | 11/1989 | White ......................... 235/462 |
| 4,955,693 A | * | 9/1990 | Bobba ........................ 350/319 |
| 4,960,984 A | * | 10/1990 | Goldenfield et al. ........ 235/462 |
| 5,149,948 A | * | 9/1992 | Chisholm ................... 235/462 |
| 5,177,346 A | * | 1/1993 | Chisholm ................... 235/462 |
| 5,298,727 A | * | 3/1994 | Spratte et al. ............... 234/462 |
| 5,515,452 A | * | 5/1996 | Penkethman et al. ....... 382/141 |
| 5,521,366 A | * | 5/1996 | Wang et al. ................. 235/454 |
| 5,525,810 A | * | 6/1996 | Jewell et al. ................ 250/566 |
| 5,545,886 A | * | 8/1996 | Metilsky et al. ............. 235/462 |
| 5,572,006 A | * | 11/1996 | Wang et al. ................. 235/454 |
| 5,574,272 A | * | 11/1996 | Seo et al. .................... 235/454 |
| 5,581,071 A | * | 12/1996 | Chen et al. .................. 235/455 |
| 5,600,116 A | * | 2/1997 | Seo et al. .................... 235/455 |
| 5,631,456 A | * | 5/1997 | Kost et al. ................... 235/462 |
| 5,654,533 A | * | 8/1997 | Suzuki et al. ............... 235/455 |
| 5,701,001 A | * | 12/1997 | Sugifune et al. ............ 235/472 |
| 5,818,018 A | * | 10/1998 | Conboy et al. ............. 235/375 |
| 5,886,338 A | * | 3/1999 | Arackellian et al. ........ 235/472 |
| 5,946,029 A | * | 8/1999 | Yoshimura et al. ......... 348/131 |

FOREIGN PATENT DOCUMENTS

JP          5-62012          3/1993

* cited by examiner

Primary Examiner—Michael G. Lee
Assistant Examiner—Daniel St. Cyr
(74) Attorney, Agent, or Firm—Pillsbury Winthrop LLP

(57) ABSTRACT

An optical information reader which can promptly eliminate mirror reflection regions with high accuracy without the need for a plurality of expensive CCDS. When it is discriminated that mirror reflection regions exist in an image of a two-dimensional code obtained by a CCD under illumination condition 1, the condition is changed to illumination condition 2 and an image is obtained. If there is a mirror reflection region also in the new image, the previously obtained image and the new image are synthesized by calculating the OR. When no mirror reflection regions exist in the synthesized image, a decoding is executed. Since it is sufficient to use only one CCD in the optical information reader, system cost is minimized. As images are obtained by the same CCD, even if images are synthesized, a positional deviation does not occur, the mirror reflection regions can be promptly eliminated with high accuracy, and an obtained image is accordingly very accurate.

21 Claims, 11 Drawing Sheets

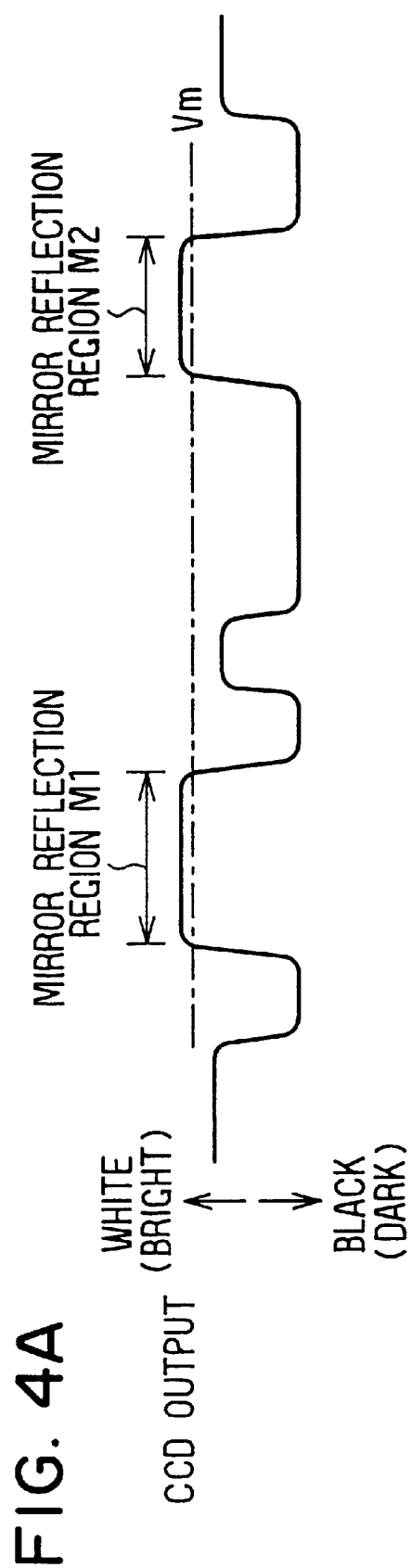

FIG. 10A

[Grid of 1s and 0s with a stepped boundary line, labeled 70d(70c)]

FIG. 10B

[Grid of 1s and 0s]

70d(70c)

OPTICAL INFORMATION READER AND RECORDING MEDIUM

CROSS-REFERENCE TO RELATED APPLICATION

The present application is related to, and claims priority from, Japanese Patent Application Hei. 9-282031, the contents of which are incorporated herein by reference.

BACKGROUND OF THE INVENTION

1. Field of the Invention

The present invention relates to an optical information reader for optically reading information from a display pattern, such as a two-dimensional code or a bar code, and a computer-readable recording medium for storing a program for realizing the functions of the optical information.

2. Discussion

An optical information reader for optically reading a display pattern, such as a bar code or a two-dimensional printed code, for article identification is known.

The optical information reader has a light emitting device, such as an LED, in a casing to illuminate a display pattern to which a reading port of the optical information reader is pointed. Light is reflected from the display into the casing, and an image is read by an image forming lens or a CCD. Information expressed by the display pattern is decoded from distribution of dark and light parts.

There is, however, a case in which a part of a display pattern, printed on a medium such as a lustrous paper, is read as a light (white) part due to mirror reflection depending on an incident angle of illumination and irrespective of black and white code-recorded parts, so that the display pattern cannot be correctly read.

In such a case, since the optical information reader itself cannot discriminate that the object to be read is abnormal, the operator has to repeat, by trial and error, by moving the optical information reader or changing the reading angle to perform the reading operation in a position and at an angle such that the mirror reflection does not influence the reading, thereby decreasing operating efficiency.

As an apparatus for reconstructing an original image from an image which is abnormal due to the mirror reflection, a pattern detecting apparatus for detecting images from two directions with respect to the same object and synthesizing the images, thereby eliminating mirror reflection regions, is known (see, for example, U.S. Pat. No. 4,654,583).

The pattern detecting apparatus, however, requires two expensive image reading means such as CCDs, thereby increasing manufacturing costs. Since images read from different directions are synthesized, the same images are not obtained. Consequently, even if the read images are synthesized, a positional error occurs and the mirror reflection regions cannot be completely eliminated. Especially, a bar code and a two-dimensional code require high accuracy in position detection of the bars or cells as elements, so that the conventional technique cannot be applied.

In the conventional technique, although it is sufficient to perform an image process so that images seen from the same direction are obtained, the operation of the image process is complicated, and causes delay in the overall reading process.

SUMMARY OF THE INVENTION

It is an object of the invention to provide an optical information reader to promptly eliminate mirror reflection regions with high accuracy without requiring a plurality of expensive image reading means.

The present invention provides such a reader. More particularly, the present invention provides an optical information reader that irradiates a display pattern with light selected from a predetermined irradiation direction. The reader then reads an image by light reflected from the display pattern, and discriminates whether mirror reflection regions exist or not in the read image. When mirror reflection regions are discriminated, the image reader then reads a new image by light irradiated from an alternative irradiation direction, and compensates for the mirror reflection regions. The image is read a predetermined number of times until an accurate reading is realized, or until the number of readings reaches a set limit, at which time an error signal is generated.

BRIEF DESCRIPTION OF THE DRAWINGS

FIGS. 4A–4B are explanatory diagrams of output signals of a CCD and a binarization circuit in the first and second embodiments;

FIGS. 10A–10B are explanatory diagrams of binary states of images detected by a CCD in the first and second embodiments;

DETAILED DESCRIPTION OF THE PREFERRED EMBODIMENTS

Figure 1:
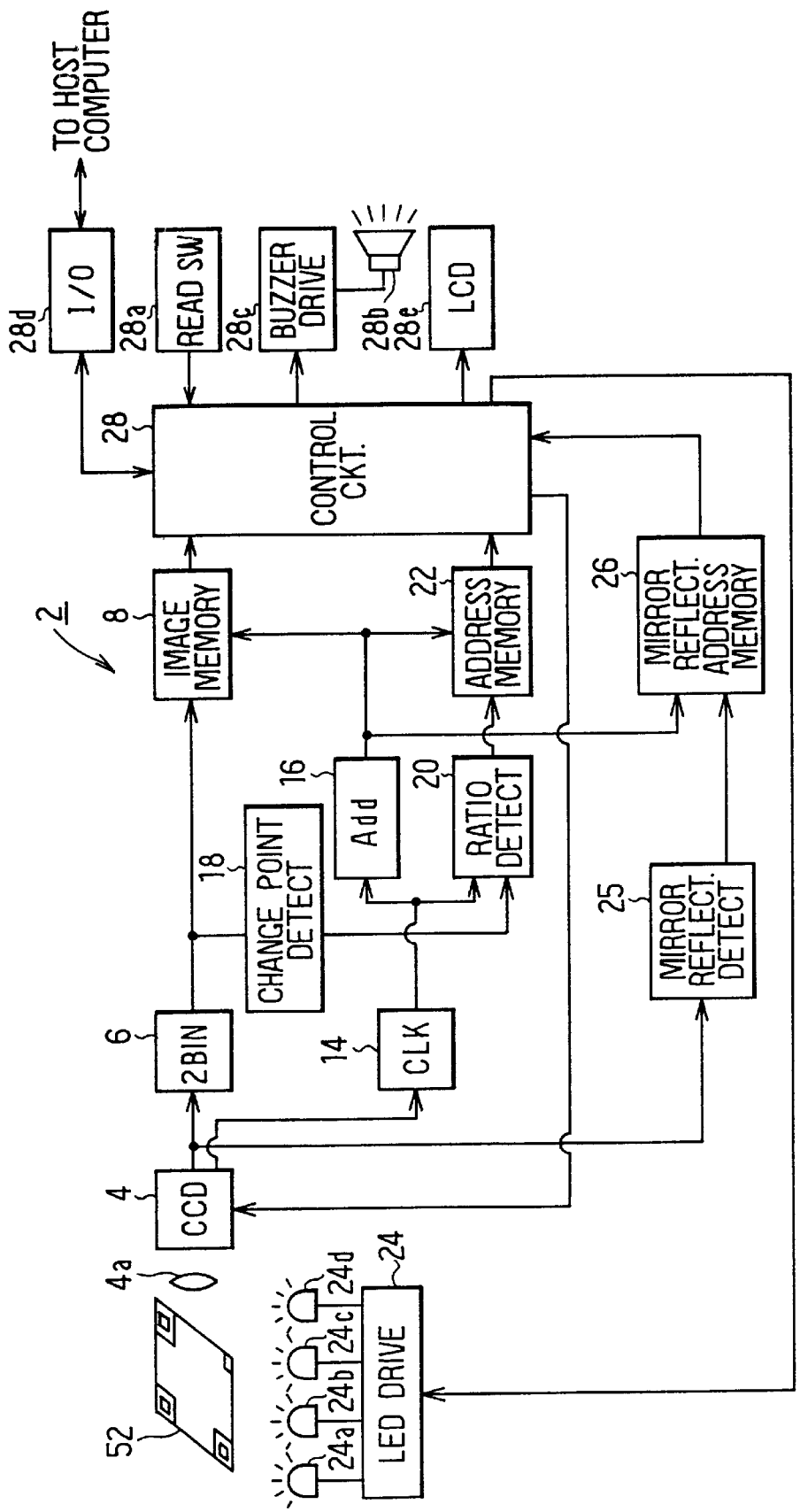
FIG. 1 is a block diagram showing a schematic construction of an optical information reader for reading a two-dimensional code as first and second embodiments.

In a block diagram of FIG. 1, a schematic construction of a first embodiment of an optical information reader 2 for reading a two-dimensional code is shown.

The optical information reader 2 comprises a CCD 4, a binarization circuit 6, an image memory 8, a clock signal output circuit 14, an address generation circuit 16, a change point detection circuit 18, a ratio detection circuit 20, a memory for storing an address (hereinafter referred to as an address memory) 22, an LED drive circuit 24, LEDs 24a, 24b, 24c, and 24d, a mirror reflection detection circuit 25, a memory for storing a mirror reflection address (hereinafter referred to as a mirror reflection address memory) 26, a read switch 28a, a buzzer 28b, a buzzer drive circuit 28c, an input/output circuit 28d, a liquid crystal display (LCD) 28e, and a control circuit 28.

The control circuit 28 is a computer system having a CPU, a ROM, a RAM, an I/O, and the like, and executes a two-dimensional code reading process described later in accordance with a program stored in the ROM, to control the components of the optical information reader 2.

Figure 2:
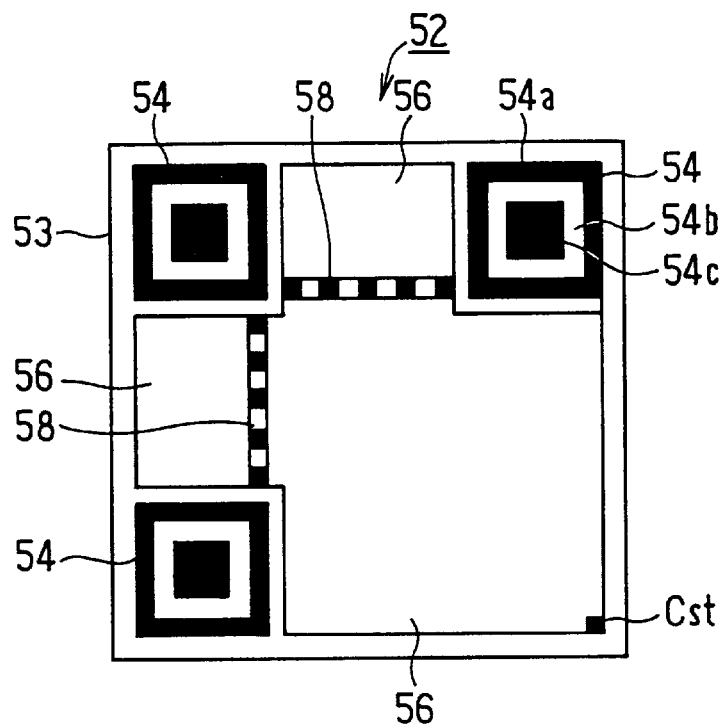
FIG. 2 is an explanatory diagram of the construction of the two-dimensional code in the first and second embodiments.

FIG. 2 shows an example of a two-dimensional code which is detected and from which information is read by the optical information reader 2. The two-dimensional code 52 is printed on a white mount 53 and is constructed by three characteristic symbols 54 for positioning, a data region 56, a timing cell train 58, and an origin cell Cst. All of the elements are arranged in a square in which the number of cells in the vertical direction and the number of cells in the horizontal direction are equal (25 cells×25 cells). Each cell is selected from two kinds of cells which are optically different and are distinguished and expressed as white (light) and black (dark) in the diagrams and explanation. In FIG. 2, for the sake of convenience, the pattern of data cells in the data region 56 is omitted.

The symbols 54 for positioning are arranged at three vertices out of the four vertices of the two-dimensional code 52. The dark and light arrangement of the cells forms a pattern in which a reduced frame-state square 54b constructed by a white part is formed in the center of a frame-state square 54a constructed by a black part. Further, a reduced square 54c constructed by a black part is formed in the center of the frame-state square 54b.

The control circuit 28 executes a read control as described below.

By an instruction of the control circuit 28, the CCD 4 two-dimensional image detecting CCD 4 detects a two-dimensional image from the two-dimensional code 52. When the two-dimensional image is detected, the CCD 4 outputs two-dimensional image data by means of multi-level signals as shown in FIG. 4(A). The binarization circuit 6 binarizes the two-dimensional image data by using a threshold instructed by the control circuit 28, thereby converting the data into signals at two levels of 1 (high) and 0 (low) as shown in FIG. 4(b).

On the other hand, the clock signal output circuit 14 outputs a clock pulse, which is sufficiently finer than the pulse of the two-dimensional image data outputted from the CCD 4, in accordance with a synchronous pulse generated from the CCD 4. The address generation circuit 16 counts the clock pulse and generates addresses for the image memory 8. The binarized two-dimensional image data is written on an 8-bit unit basis every address.

The change point detection circuit 18 generates a pulse signal to the ratio detection circuit 20 when there is a change from "1" to "0" or from "0" to "1" in the signals from the binarization circuit 6. The ratio detection circuit 20 obtains a length in which "light" (1) continues and a length in which "dark" (0) continues in the two-dimensional image by counting the clock pulses generated from the clock signal output circuit 14 for a period of time from the input of the pulse signal from the change point detection circuit 18 until the next input of the pulse signal. From the ratio of the lengths, a pattern corresponding to the symbol 54 for positioning in the two-dimensional code 52 is detected.

Figure 3A:
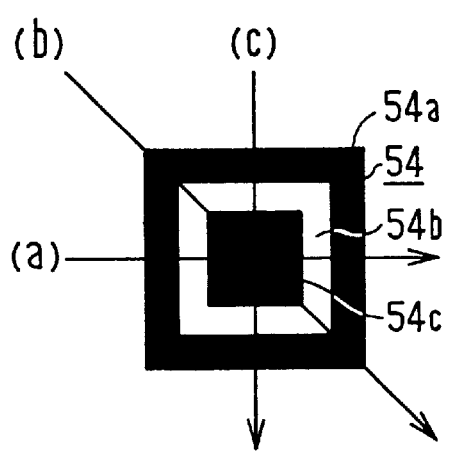
FIG. 3 is an explanatory diagram of detection of dark and light parts when symbols for positioning are scanned in the first and second embodiments.
Figure 3B:
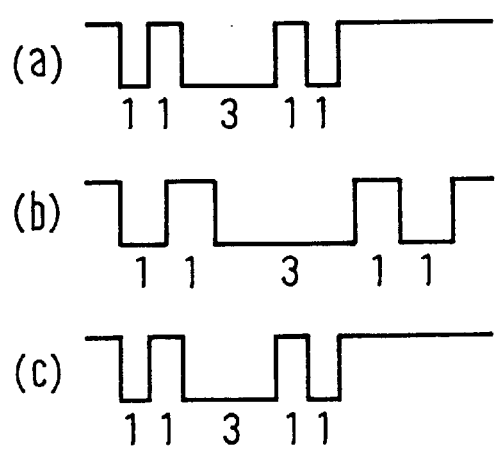

As shown in FIG. 3(A), the dark/light patterns of scanning lines (a), (b), and (c) of the CCD 4 which cross an almost center of the symbol 54 for positioning at representative angles are constructed at the same dark/light component ratio. That is, the dark/light component ratio of the scanning lines (a), (b), and (c) which cross the central part of the symbol 54 for positioning is dark:light:dark:light:dark= 1:1:3:1:1. It should be understood that the ratio of scanning lines at intermediate angles of the angles of the scanning lines (a), (b), and (c) is also 1:1:3:1:1. Even when the figure of FIG. 3(A) is arranged in an oblique plane as seen from the CCD 4 side, the dark/light component ratio of the scanning lines (a), (b), and (c) is maintained as dark:light:dark: light:dark=1:1:3:1:1. FIG. 3(B) corresponds to binarized signals from the binarization circuit 6.

The ratio detection circuit 20 detects the dark/light component ratio of "1:1:3:1:1" in the above manner and, upon detection, stores an address of the image memory 8 generated by the address generation circuit 16 at that timing into the address memory 22.

In the two-dimensional image data outputted from the CCD 4, as shown in FIG. 4(A), when luminous intensity regions (mirror reflection regions M1 and M2) higher than a mirror reflection luminous intensity discrimination value Vm exist, the mirror reflection detection circuit 25 generates pulses at the start and end positions of each of the mirror reflection regions M1 and M2. The mirror reflection address memory 26 stores addresses generated from the address generation circuit 16 at timings between the pulse of the start position and the pulse of the end position.

Consequently, when the CCD 4 detects two-dimensional image data of one frame, binarized two-dimensional image data is stored into the image memory 8. The address of the symbol 54 for positioning of the detected data is stored in the address memory 22. The addresses of the mirror reflection regions M1 and M2 of the detected data are stored into the mirror reflection address memory 26.

Figure 5:
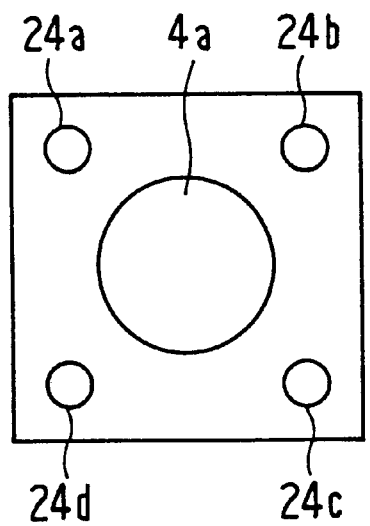
FIG. 5 is an explanatory diagram of arrangement of four LEDs for an image forming lens in the first and second embodiments.
Figure 6:
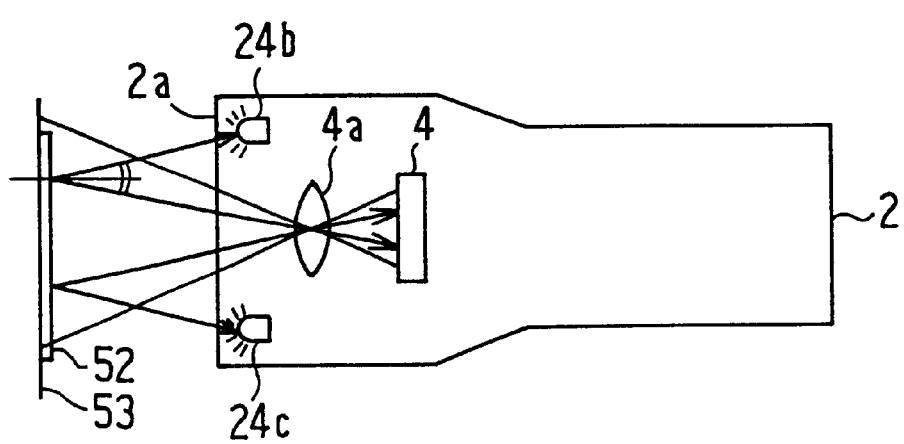
FIG. 6 is an explanatory diagram of the mirror reflection in the two-dimensional code in the above embodiments.

As shown in FIG. 5, the four LEDs 24a to 24d for illuminating the two-dimensional code 52 are arranged around an image forming lens 4a provided in front of the CCD 4. As shown in FIG. 6, when the reading port 2a, that is, the image forming lens 4a is pointed toward the two-dimensional code 52 printed on the surface of the mount 53, the LEDs 24a to 24d illuminate the two-dimensional code 52.

Power-on of the LEDs 24a to 24d is regulated by the control circuit 28 via the LED drive circuit 24. In the embodiment, either one of illumination conditions 1 to 3 is executed in a lighting state. Under the illumination condition 1, all of the four LEDs 24a to 24d are turned on. Under the illumination condition 2, two LEDs 24a and 24b are turned on. Under the illumination condition 3, the other two LEDs 24c and 24d are turned on.

The two-dimensional code reading process executed by the control circuit 28 will be described on the basis of the flow diagrams in FIGS. 7 and 8. For example, the process is started when an electric power is supplied from a battery or the like to the optical information reader 2.

First, it is determined if the operator turned "ON" the read switch 28a provided for the optical information reader 2 (S80). The determining process of step S80 is repeated as long as the "OFF" state of the read switch 28a continues.

Figure 8:
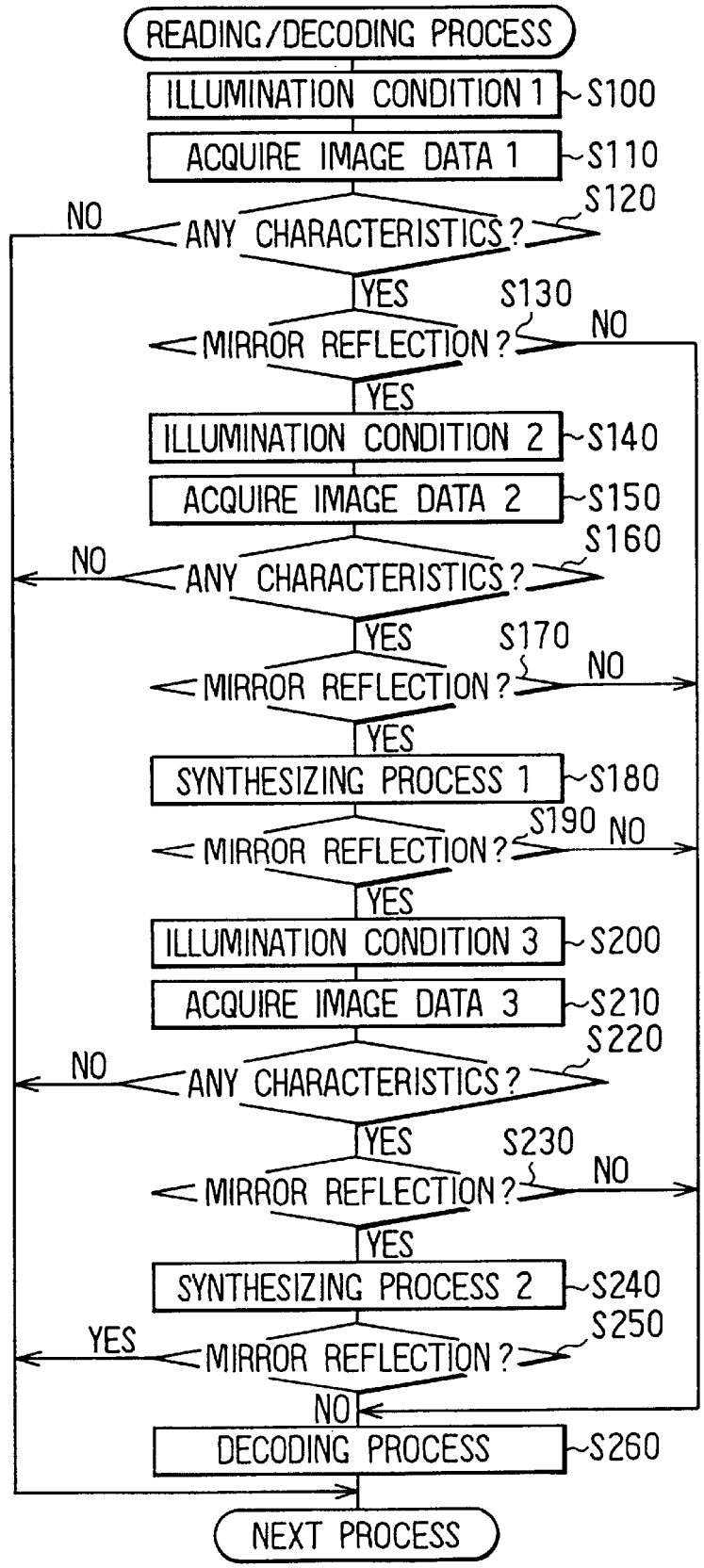
FIG. 8 is a flow diagram of reading and decoding processes in the first and second embodiments.

When the read switch 28a is turned on, N (an integer which is equal to or larger than 1) is set in a counter variable (n) for regulating the number of repetitions of the reading and decoding process (S84) shown in FIG. 8 to be executed until the decoding is sucessful (S82). Then, the reading and decoding process shown in FIG. 8 is executed (S84).

Referring to FIG. 8, in the reading and decoding process, the LED drive circuit 24 is first driven and the illumination condition 1 is executed (S100), and all of the four LEDs 24a to 24d are turned on. As mentioned above, two-dimensional image data of one frame is acquired by the CCD 4 (S110). In this instance, the binarized two-dimensional image data is stored into the image memory 8, the address of the symbol 54 for positioning of the detected data is stored into the address memory 22, and the addresses of the mirror reflection region of the detected data are stored into the mirror reflection address memory 26.

Figure 9A:
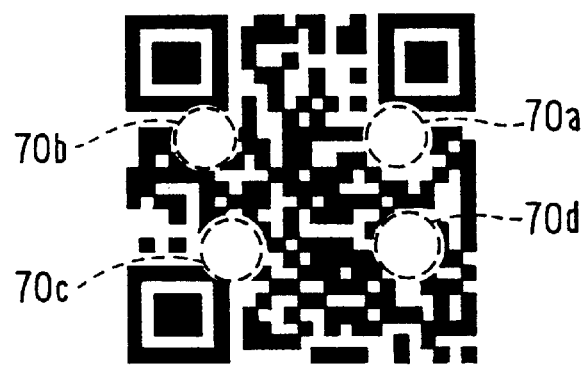
FIGS. 9A–9D are explanatory diagrams of arrangement states of the mirror reflection in the first and second embodiments.

FIG. 9(A) shows the two-dimensional image data binarized and stored in the image memory 8. FIG. 9(A) shows a state in which the mirror reflection occurs on the surface of the two-dimensional code 52, and in which mirror reflection images 70a, 70b, 70c, and 70d of illumination light emitted from the LEDs 24a to 24d are detected by the CCD 4 as shown in FIG. 6.

Subsequently, a characteristic detection is performed (S120). Since the embodiment relates to a process for detecting the two-dimensional code 52 shown in FIG. 2, the characteristic detection is executed by discriminating whether three symbols 54 for positioning exist or not in the positional relation as shown in FIG. 2 on the basis of the contents of the address memory 22.

If the three symbols 54 for positioning do not exist in the positional relation as shown in FIG. 2 ("absent" in step S120), the reading and decoding process (S84) is finished.

If the three symbols 54 for positioning exist in the positional relation as shown in FIG. 2 ("present" in step S120), whether mirror reflection regions exist or not is discriminated next (S130). In the discrimination, when the mirror reflection address memory 26 is checked and no address is stored, the mirror reflection region does not exist ("absent" in step S130). A decoding process for reading information expressed by the two-dimensional code 52 is executed on the basis of the two-dimensional image data acquired in step S110 and stored into the image memory 8, and the address of the symbol 54 for positioning stored in the address memory 22 (S260). In the decoding process, the position of each cell in the data region 56 is determined by the three symbols 54 for positioning, and the two timing cell trains 58 in which white and black parts are alternately arranged. Each position is detected to be dark or light, and each cell is determined to be dark or light. In this manner, the arrangement of "0" (light) and "1" (dark) is determined, and the information expressed by the two-dimensional code 52 is acquired.

Since the address is stored in the mirror reflection address memory 26, when it is discriminated that the mirror reflection region exists in step S130 ("present" in S130), the LED drive circuit 24 is driven and the illumination condition 2 is executed (S140). That is, two LEDs 24a and 24b are turned on. The two-dimensional image data of one frame is acquired by the CCD 4 (S150). In this instance, in the image memory 8, the binarized two-dimensional image data is stored into a region different from the memory region which is used when data is acquired in step S110. In the address memory 22, the address of the symbol 54 for positioning of the detected data is stored into a region different from the memory region which is used when data is acquired in step S110. In the mirror reflection address memory 26, the address of the mirror reflection region is stored into a region different from the memory region which is used when data is acquired in step S110.

Whether a characteristic exists or not in the data of the image acquired in step S150 is discriminated (S160). The process is the same as that of step 120. When there is no characteristic ("absent" in step S160), the reading and decoding process (S84) is finished.

When there is a characteristic ("present" in S160), whether the mirror reflection region exists or not in the data of the image acquired in step S150 is discriminated (S170). The process is the same as that of step S130.

If no mirror reflection region exists ("absent" in S170), the decoding process of step S260 is executed by using the data of the image acquired in step S150.

If the mirror reflection region exists ("present" in S170), a synthesizing process is performed in such a manner that the mirror reflection region in the two-dimensional image data existing in the image memory 8 acquired in step S110 is compensated by the two-dimensional image data existing in the image memory 8 acquired in step S150 (S180).

Figure 9B:
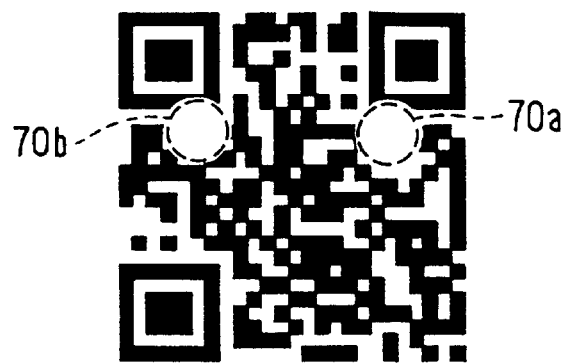

For example, when it is assumed that two-dimensional image data shown by FIG. 9(A) is obtained in step S110 and two-dimensional image data shown by FIG. 9(B) is obtained in step S150, mirror reflection regions of mirror reflection image parts 70c and 70d in the two-dimensional image data of FIG. 9(A) can be eliminated by compensating with the image of FIG. 9(B).

Figure 11:
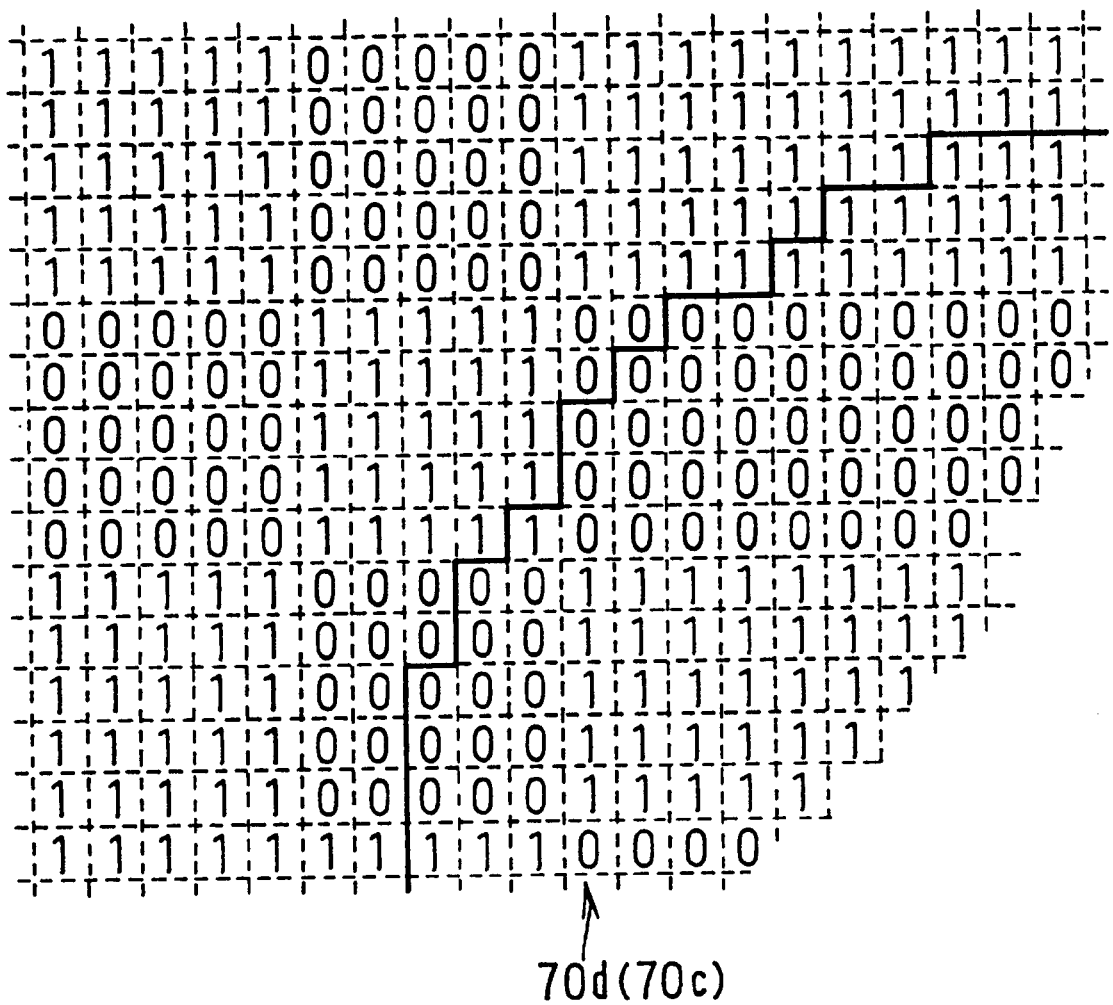
FIG. 11 is an explanatory diagram of a binary state of a synthesized image in the first and second embodiments.

As a method of compensating the mirror reflection region, the binarized two-dimensional image shown in FIG. 10(A) obtained in step S110 and the binarized two-dimensional image shown in FIG. 10(B) obtained in step S150 are synthesized. That is, the OR of the two-dimensional images is obtained, thereby enabling a two-dimensional image from which the mirror reflection image parts 70c and 70d are eliminated as shown in FIG. 11 to be obtained.

A check is made to see if the mirror reflection regions still exist in the two-dimensional image from which the mirror reflection image parts 70c and 70d have been eliminated as mentioned above (S190). The check is made in such a manner that addresses which are not included in the addresses of the mirror reflection regions stored in step S150 among the addresses of the mirror reflection regions stored in step S110 stored in the mirror reflection address memory 26 are erased. Consequently, when all of the addresses of the mirror reflection regions stored in step S110 are erased, there is no mirror reflection region.

When there is no mirror reflection region ("absent" in S190), the processing routine advances to the decoding process of the two-dimensional image synthesized in step S180 (S260).

If the addresses of the mirror reflection regions stored in step S110 remain even after erasing the addresses which are not included in the addresses of the mirror reflection regions stored in step S150, the mirror reflection regions still exist ("present" in S190). Therefore, the LED drive circuit 24 is driven and the illumination condition 3 is executed (S200).

That is, two LEDs 24c and 24d are turned on and two-dimensional image data of one frame is acquired by the CCD 4 (S210). In this instance, in the image memory 8, binarized two-dimensional image data is stored into a region different from the memory regions used when the images are acquired in steps S110 and S150. In the address memory 22, the address of the symbol 54 for positioning of the detected data is stored into a region different from the memory regions used when the images are acquired in steps S110 and S150. In the mirror reflection address memory 26, the addresses of the mirror reflection regions of the detected data are stored in a region different from the memory regions used when the images are acquired in steps S110 and S150.

Whether a characteristic exists or not in the data of the image acquired in step S210 is discriminated (S220). The process is the same as that of step S120. If there is no characteristic ("absent" in step S220), the reading and decoding process (S84) is finished.

If there is a characteristic ("present" in step S220), whether the mirror reflection regions exist or not in the data of the image acquired in step S210 is discriminated (S230). The process is the same as that of step S130.

When there is no mirror reflection region ("absent" in step S230), the decoding process of step S260 is executed by using the data of the image acquired in step S210.

Figure 9C:
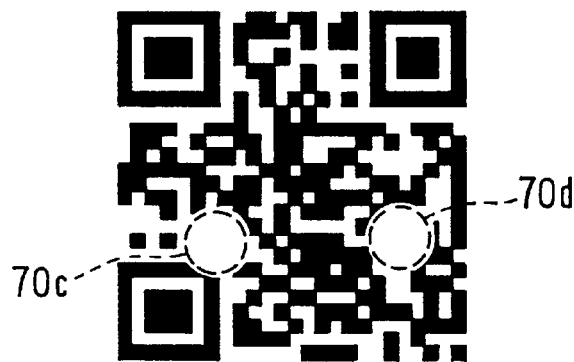

For example, when the mirror reflection regions exist ("present" in S230) as shown in FIG. 9(C), a synthesizing process for eliminating the mirror reflection regions is performed. The process compensates for the mirror reflection regions of the two-dimensional image data, synthesized in step S180 and stored in the image memory 8, by the two-dimensional image data existing in the image memory 8 acquired in step S210 (S240). The synthesizing process is executed in a manner similar to step S180.

Figure 9D:
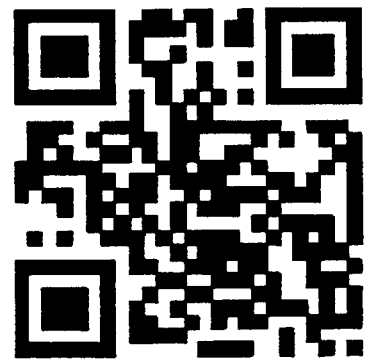

Whether the mirror reflection regions exist or not in the two-dimensional image obtained by the synthesis is discriminated (S250). When all of the mirror reflection regions are eliminated by the synthesis ("absent" in S250), the decoding process is performed by using the two-dimensional image synthesized in step S240 (S260). That is, for example, when an image from which all of the mirror reflection regions are removed as shown in FIG. 9(D) is obtained by synthesizing the image obtained by synthesizing the images of FIGS. 9(A)–9(C), the decoding process (S260) is executed by using the two-dimensional image of FIG. 9(D).

When the mirror reflection regions are not removed even after the synthesizing process of step S240 ("present" in step S250), the reading and decoding process (S84) is finished.

When the reading and decoding process is finished in step S260, when it is discriminated in step S120, S160, or S220 that there is no characteristic, or when it is discriminated that the mirror reflection regions exist in step S250, it is next discriminated whether the decoding has succeeded or not (S86). If it has succeeded ("YES" in step S86), the buzzer 28b is sounded by driving the buzzer drive circuit 28c (S88), and the operator is thereby notified.

The decoded information expressed by the two-dimensional code 52 is outputted to the host computer side via the input/output circuit 28d (S90), and the processing routine is returned to the process of step S80, to wait for a subsequent activation of the read switch 28a.

When the processing routine does not reach the decoding of the two-dimensional code 52 or the decoding fails in the reading and decoding process ("NO" in S86), the counter variable (n) is decreased (S92).

Subsequently, it is discriminated whether the value of the counter variable (n) is larger than 0 (S94). If n>0 ("YES" in S94), the processing routine is returned to step S84 and the above-mentioned reading and decoding process is executed again. If n=0 ("NO" in S94), it is regarded that the decoding operation cannot be executed, an error is displayed on the liquid crystal display 28e (S96), and the processing routine is returned to the process of step S80.

In the embodiment, as mentioned above, when it is discriminated that the level of brightness in the mirror reflection regions exists in the image of the two-dimensional code 52 acquired from the CCD 4 under the illumination condition 1, the condition is changed to the illumination condition 2. That is, the combination of lighting of the LEDs 24a to 24d is changed and the irradiation direction is changed. Consequently, when the image of the two-dimensional code 52 in which no mirror reflection regions exist can be obtained, the two-dimensional code 52 is decoded by using the new image.

If the mirror reflection regions exist also in the new image, however, the image previously obtained and the new image are synthesized by calculating the OR. For example, the image obtained in step S110 (corresponding to the image previously obtained) and the image obtained in step S150 (corresponding to the new image) are synthesized in step S180. In this manner, the image from which the mirror reflection regions are eliminated is derived.

Then, the decoding of the two-dimensional code 52 in the synthesized image is executed. When the mirror reflection regions which cannot be compensated still exist in the synthesized image, the illumination condition is further changed to the illumination condition 3, and a new image is obtained. If no mirror reflection regions exist in the image, the two-dimensional code 52 is decoded by using the image. If the mirror reflection regions exist in the image, by synthesizing the image already obtained by the synthesis in step S180 (corresponding to the image previously obtained, or the two images obtained in steps S110 and S150 can be also regarded as the images previously obtained) with a new image obtained in step S210, the mirror reflection regions are compensated. The decoding is performed by using the synthesized image.

Since the optical information reader 2 requires only one CCD 4, system cost is not increased.

In contrast to one CCD 4, the LEDs 24a to 24d are constructed so that a plurality of combinations (three combinations in this case) of the four LEDs 24a to 24d are used to emit light selectively from a plurality of irradiating directions by the LED drive circuit 24. Such a construction can be realized mostly by a software change and by slightly changing the LED drive circuit 24. As compared with a case of increasing the number of CCDs 4, increase in cost is extremely low, and the costs are reduced as a whole.

Also, both of the previous and new images are obtained by the same CCD 4. This denotes that these images are obtained as images seen from the same direction, although only the reflection states are different. Consequently, when the image previously obtained is compensated by the new image, no positional deviation occurs, the mirror reflection regions can be eliminated promptly with high accuracy, and the image obtained by the compensating process is also very accurate.

After the new image is obtained, whether the mirror reflection regions exist or not in the new image is discriminated. If no mirror reflection regions exist, only the new image is used as an object of the decoding process, and the process for compensating the previously obtained image is not executed. As mentioned above, when the new image is perfect, the image can be used as an object of the decoding process, and a complicated process for compensating the image is unnecessary, so that the speed of the whole process is increased.

Figure 7:
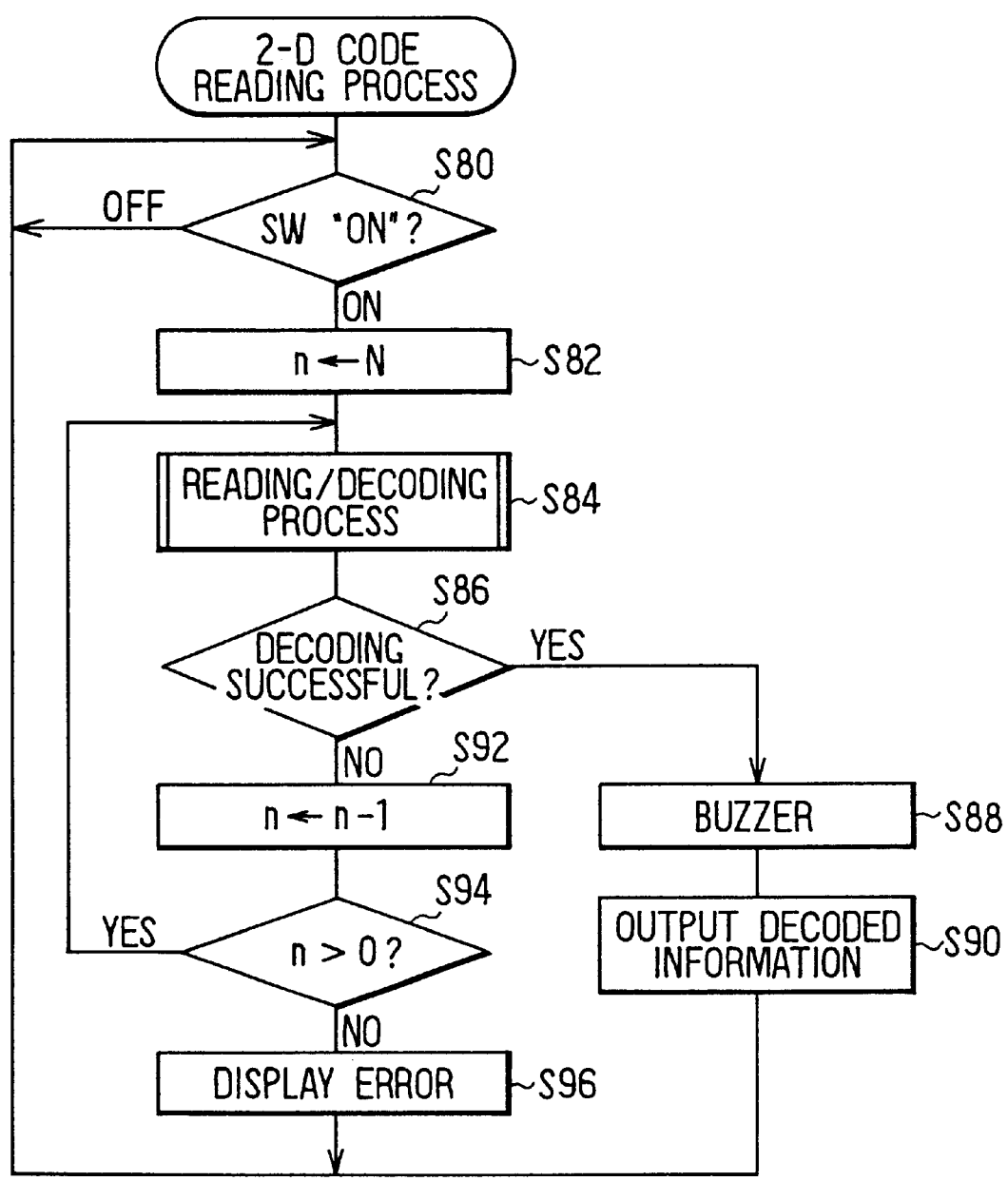
FIG. 7 is a flow diagram of a two-dimensional code reading process in the first embodiment.
Figure 12:
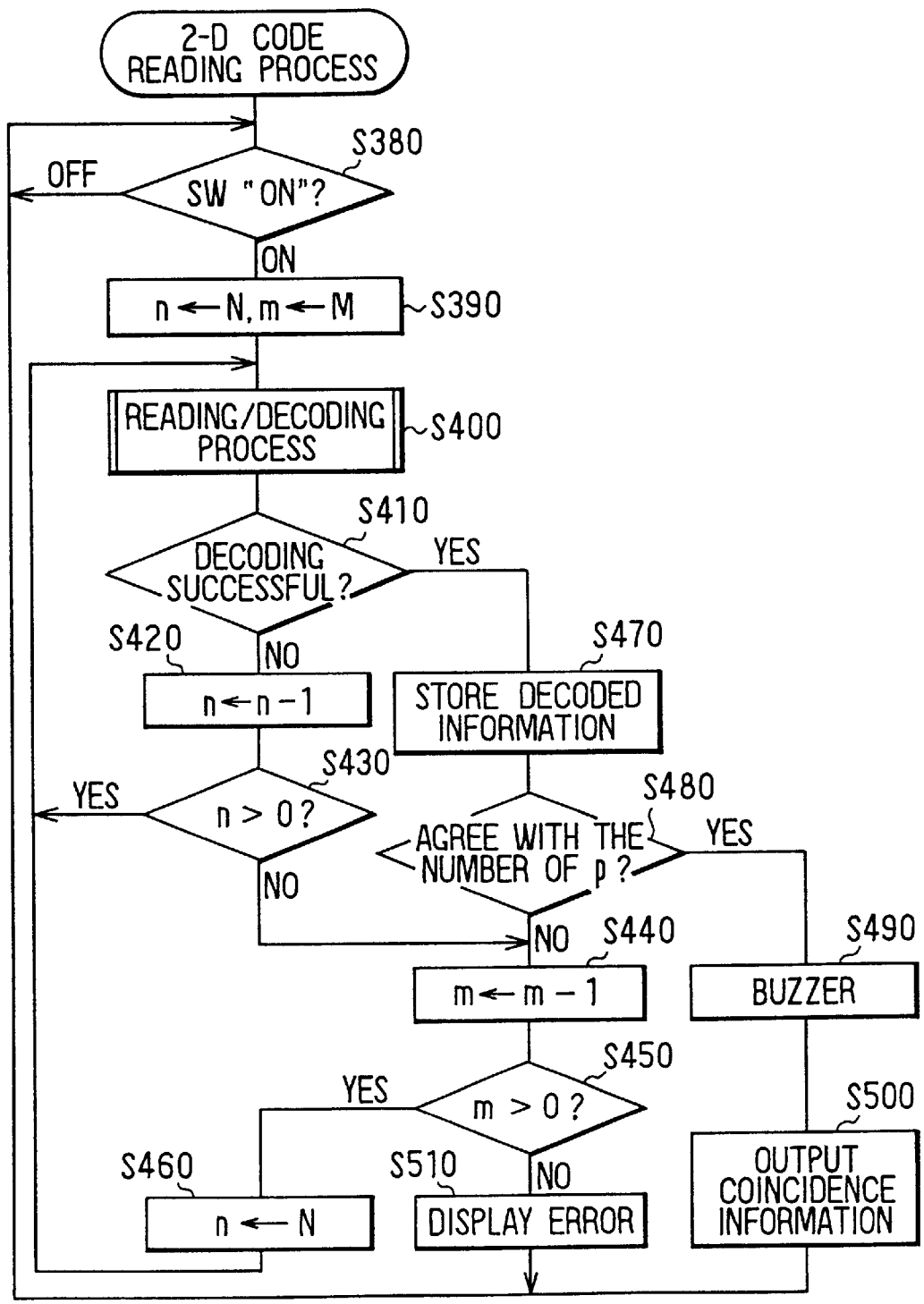
FIG. 12 is a flow diagram of a two-dimensional code reading process in the second embodiment.

The second embodiment is different from the first embodiment, as a two-dimensional code reading process shown in FIG. 12 is stored and executed instead of the two-dimensional code reading process of FIG. 7. The other construction and process are the same as those of the first embodiment.

In the two-dimensional code reading process of FIG. 12, whether the read switch 28a provided for the optical information reader 2 is turned on or not by the operator is discriminated (S380). As long as the off state of the read switch 28a continues, the discriminating process of step S380 is repeated.

When the read switch 28a is turned on, N (an integer equal to or larger than 1) is set to the counter variable (n) to regulate the number of repetitions of the reading and decoding process (S400) until the decoding is successful and M (an integer equal to or larger than 1) is set to a counter variable (m) for regulating the maximum number of repetitions of the reading and decoding process (S400) executed by one operation of the read switch 28a (S390). Then, the reading and decoding process (S400) is executed. The contents of the reading and decoding process (S400) are the same as those of the reading and decoding process of FIG. 8 described in the first embodiment.

When the reading and decoding process (S400) is finished, whether the decoding has succeeded or not is discriminated (S410). When the processing routine does not reach the decoding of the two-dimensional code 52 in the reading and decoding process (S400) or the decoding is failed ("NO" in S410), the counter variable (n) is decreased (S420).

Subsequently, whether the value of the counter variable (n) is larger than 0 or not is discriminated (S430). If n>0 ("YES" in S430), the processing routine is returned to step S400 and the reading and decoding process is executed again. If n=0 ("NO" in S430), it is regarded that the decoding cannot be executed even if the reading and decoding process (S400) is performed (N) times, and the counter variable (m) is decreased (S440).

Subsequently, whether the value of the counter variable (m) is larger than 0 or not is discriminated (S450). If m>0 ("YES" in S450), (N) is set to the counter variable (n) (S460), the processing routine is returned to step S400 and the above-mentioned reading and decoding process is executed again.

When the decoding has succeeded ("YES" in S410) while repeatedly executing the reading and decoding process (S400), the decoded information of the decoded two-dimensional code 52 is stored into the RAM (S470). Subsequently, whether (p) (an integer equal to or larger than 2, which corresponds to the reference number) decoded information coincides with each other or not in the information of the two-dimensional code 52 decoded as mentioned above is discriminated (S480). When the number of coincidence is less than (p) ("NO" in S480), the counter variable (m) is decreased (S440). When m>0 ("YES" in S450), (N) is set to the counter variable (n) (S460), the processing routine is returned to step S400 and the above-mentioned reading and decoding process is performed again.

When such a process is repeated, the decoded information is accumulated, and (p) decoded information coincides ("YES" in S480), the buzzer 28b is sounded by driving the buzzer drive circuit 28c (S490), thereby notifying the operator of the decoding. The (p) coincided decoded information is output to the host computer side via the input/output circuit 28d (S500), and the processing routine is returned to the process of step S380, to await subsequent operation of the read switch 28a.

When no decoded information is obtained or (p) coincided decoded information cannot be obtained, when the decrement of the counter variable (m) is repeated until m=0 ("NO" in S450), an error is displayed on the liquid crystal display 28e (S510), and the processing routine is returned to the process of step S380.

According to the second embodiment, in addition to the effects of the first embodiment, the decoded information is not output to the host computer side until the (p) decoded information coincides. That is, when the (p) decoded information coincides, it is regarded for the first time that the decoding is successful. Consequently, decoded information which is erroneous due to noises is not output to the host computer side.

In the foregoing first and second embodiments, "0" is set to the light part and "1" is set to the dark part when the image obtained by the CCD 4 is binarized. Consequently, "0" is set to the mirror reflection regions. As a method of compensating the mirror reflection regions, therefore, the method of calculating the OR of two or more images is adopted. On the contrary, when an image is binarized by setting "1" to the light part in the image and setting "0" to the dark part, "1" is set to the mirror reflection regions. By calculating the AND of two or more images, the mirror reflection regions can be compensated.

According to another method of compensating the mirror reflection regions, since the length or width in which "light" continues is relatively small except for the mirror reflection regions in an actual image of the two-dimensional code 52, the number of discriminated mirror reflection regions for distinction from the continuity of "light" parts in a regular state is set. When the "light" parts are continuously detected more than the number of discriminated mirror reflection regions, the part is discriminated as a mirror reflection region and can be replaced by a region which is not discriminated as a mirror reflection region in a newly obtained image. Alternatively, the mirror reflection regions in the newly obtained image are detected and are replaced by regions which are not discriminated as mirror reflection regions in the previously obtained image.

Although the order of the illumination conditions in the first and second embodiments is "turn-on of all the LEDs 24a to 24d→turn-on two LEDs 24a and 24b→turn-on the other two LEDs 24c and 24d", an order of "turn-on of the two LEDs 24a and 24b→turn-on of the other two LEDs 24c and 24d→turn-on of all of the LEDs 24a to 24d" or other orders can also be also utilized. It is also possible that "turn-on of all of the LEDs 24a to 24d" is not executed but only "turn-on of the two LEDs 24a and 24b→turn-on of the other two LEDs 24c and 24d" is performed.

Figure 13A:
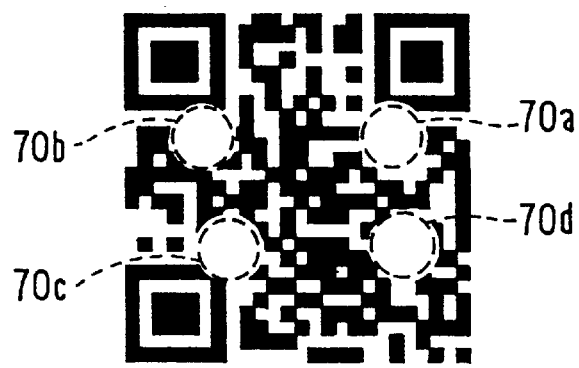
FIGS. 13A–13D are explanatory diagrams of other arrangement states of the mirror reflection.
Figure 13B:
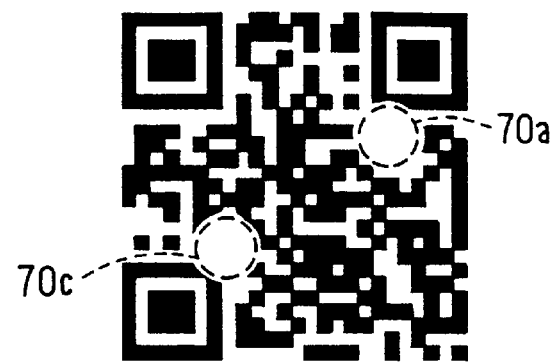
Figure 13C:
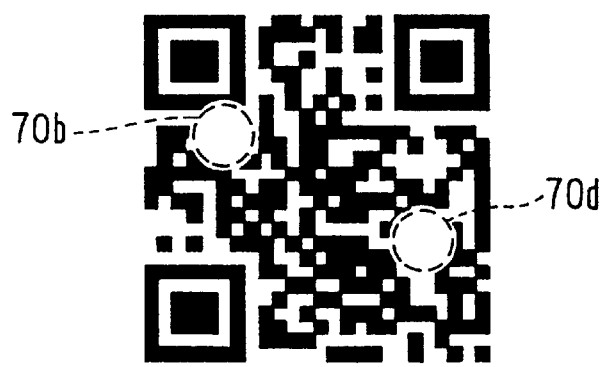
Figure 13D:
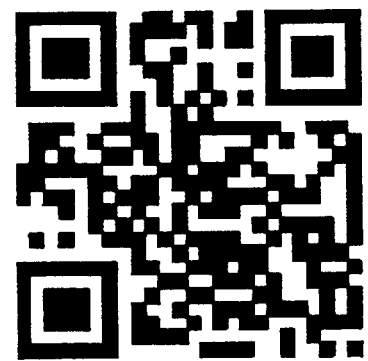

Besides the above, as shown in FIG. 13, FIG. 13(A) of "turn-on of all of the LEDs 24a to 24d", FIG. 13(B) of "turn-on of the two LEDs 24a and 24c which are on a diagonal line", and FIG. 13(C) of "turn-on of the two LEDs 24b and 24d on the other diagonal line" can be combined. In this manner as well, an image from which the mirror reflection regions are eliminated can be synthesized as shown in FIG. 13(D) and the image can be used as a decoding object.

Not only the illumination conditions of turning on the two LEDs as shown in FIGS. 9(B) and (C) and FIGS. 13(B) and (C), an illumination condition under which one LED is changed and turned on, and an illumination condition under which selected three LEDs are turned on while changing the combination of them may be also used.

Although four LEDS are used in the first and second embodiments, two LEDs or five or more LEDs can be also used.

If the quantity of light is insufficient according to the number of LEDS which are turned on, it is sufficient to increase exposure time of the CCD 4 or increase an output itself of the LED.

Although the light-on combination of the LEDs 24a to 24d is changed in the first and second embodiments in order to select the radiation direction, even in the case where only one LED is provided for the optical information reader 2, by changing the direction of reflection of a reflector such as a mirror, the radiation direction from the optical information reader 2 can be changed even if only one LED is used. Alternatively, the radiation direction can be selected in such a manner that the four LEDs 24a to 24d are always in the light-on state, a shutter is provided in front of each of the LEDs 24a to 24d, and each of the shutters is on/off controlled, thereby selecting the radiation direction.

The image memory 8, the address memory 22, and the mirror reflection address memory 26 which are used by the optical information reader 2 can be constructed by one RAM or by different RAMs.

Although the contents of the foregoing first and second embodiments relate to the case where the invention is applied to the two-dimensional code 52, the contents can be also similarly used for reading a bar code. In case of the bar code, in place of the symbols 54 for positioning, guard bars existing at both ends and a center bar existing in the center part are used.

What is claimed is:

1. An optical information reader comprising:

light irradiating means comprising a plurality of point light sources, said light irradiating means directly irradiating a display pattern as an object to be read with illumination light selectively from one of a plurality of irradiation directions;

image reading means for reading an image by light reflected from said display pattern;

mirror reflection discriminating means for discriminating whether mirror reflection regions exist or not in the image read by said image reading means; and information reading means which causes said image reading means to read a new image by causing said light irradiating means to select an alternative combination of said irradiation directions, and to emit illumination light as a compensating process, when said light irradiating beems is discriminated by said mirror reflection discriminating means that at least one of the mirror reflection regions exist in the image obtained by said image reading means, said information reading means using said new image to compensate for the mirror reflection regions of the image obtained before said new image by combining portions of said image having minimal mirror reflection regions and said new image having minimal mirror reflection regions to generate a final image having minimal mirror reflection regions, said information reading means reading said final image as an object from which information is read.

2. The optical information reader of claim 1, wherein said information reading means uses said image as an object from which information is read when it is discriminated by said mirror reflection discriminating means that no mirror reflection regions exist in the image.

3. The optical information reader of claim 1, wherein said information reading means causes said image reading means to read said new image in said compensating process, and then causes said mirror reflection discriminating means to discriminate whether mirror reflection regions exist in said new image, when no mirror reflection regions exist in said new image, only said new image is used as an object from which information is read and no compensation occurs for the mirror reflection regions of the previously obtained image, and when the at least one mirror reflection region exists in said new image, compensation occurs for the mirror reflection regions of the previously obtained image.

4. The optical information reader of claim 1, wherein when mirror reflection regions which cannot be compensated still exist in the image obtained by said compensating process after executing said compensating process, said information reading means repeats a process for executing said compensating process while changing a combination of the radiation directions until the mirror reflection regions are eliminated.

5. The optical information reader of claim 1, wherein when a region having luminous intensity higher than a mirror reflection luminous intensity discriminating value exists in an image read by said image reading means, said mirror reflection discriminating means discriminates that the mirror reflection region exists.

6. The optical information reader of claim 1, wherein said mirror reflection discriminating means determines that at least one of the mirror reflection regions exists when an intensity of said light reflected by said display pattern is greater than a discriminating number.

7. The optical information reader according to claim 1, wherein said mirror reflection discriminating means discriminates whether the mirror reflection region exists in a region corresponding to said display pattern in an image read by said image reading means.

8. The optical information reader of claim 1, wherein a process for compensating the mirror reflection region in the image obtained previously in said compensating process is a process for synthesizing the image previously obtained with a new image.

9. The optical information reader of claim 8, wherein when an image is binarized by setting "1" to a dark part and by setting "0" to a light part, said synthesizing process is performed by obtaining the OR of both of said images.

10. The optical information reader of claim 8, wherein when the image is binarized by setting "0" to a dark part and by setting "1" to a light part, said synthesizing process is executed by obtaining the AND of both of said images.

11. The optical information reader of claim 1, further comprising information accuracy discriminating means for allowing the process of said information reading means to be repeated to the same display pattern and discriminating that information is real information of said display pattern when the information having the same contents is obtained a reference number of times or more.

12. The optical information reader of claim 1, further comprising a recording medium including a program for operating a computer system.

13. An optical information reader comprising:

at least one point light source to selectively irradiate coded information with radiation of a first predetermined pattern;

a detector that is operative to sense radiation reflected from the coded information; and a controller that is programmed to discriminate whether mirror reflection regions exist on the coded information as detected by the detector, to cause the at least one point light source to irradiate the coded information with radiation of a second predetermined pattern if at least one of the mirror reflection regions exists, and to compensate for the at least one mirror reflection region based on the second predetermined pattern by combining portions of information based on reflected radiation of the first predetermined pattern having minimal mirror reflection regions with portions of information based on reflected radiation of the second predetermined pattern that correspond to a location of the at least one mirror reflection region.

14. The optical information reader of claim 13, wherein the controller discriminates that the at least one mirror reflection region exists when a region having a luminous intensity higher than a predetermined reflection region luminous intensity exists in the reflected radiation sensed by the detector.

15. A method of optically reading coded information, comprising:

irradiating, from at least one point light source, coded information in a first predetermined pattern;

reading an image of the coded information via light reflected from the coded information resulting from the irradiating;

discriminating whether at least one mirror reflection exists in the read image of the coded information;

irradiating, from said at least one point light source, the coded information in a second predetermined pattern, if the at least one mirror reflection exists; and combining portions of information based on reflected radiation of the first predetermined pattern having minimal mirror reflection regions with portions of information based on reflected radiation of the second predetermined pattern that correspond to a location of the at least one mirror reflection region.

16. The method of claim 15, wherein the irradiating is repeated a predetermined number of times to attempt to compensate for the at least one mirror reflection.

17. The method of claim 16, further comprising synthesizing coded information from the irradiating of the coded information in an alternate pattern, with coded information from the irradiating of the coded information in the predetermined pattern, to eliminate errors caused by the at least one mirror reflection.

18. An optical information reader comprising:

a radiation source comprising a plurality of point light sources, said radiation source directly irradiating a display pattern as an object to read with illumination light selectively from one of a plurality of irradiation directions;

an image reader for reading an image by light reflected from said display pattern;

a mirror reflection discriminating mechanism for discriminating whether a mirror reflection region exists in the image read by the image reader; and an information reading mechanism which causes said image reader to read a new image by causing said radiation source to select an alternative combination of said irradiation directions, and to emit illumination light as a compensating process, when said mirror reflecting discriminating mechanism determines that the mirror reflection region exists in the image obtained by said image reader, said information reading mechanism executing a process for compensating that combines the mirror reflection region of the image obtained before said new image with said new image to generate a final image, and to read image information obtained by said compensating process as an object from which information is read.

19. The optical information reader of claim 18, wherein said information reading mechanism causes said image reader to read said new image in said compensating process, and then causes said mirror reflection discriminating mechanism to discriminate whether a mirror reflection region exists in said new image, and when no mirror reflection region exists in said new image, only said new image is used as an object from which information is read and no compensation occurs for the mirror reflection region of the previously obtained image, and when the mirror reflection region exists in said new image, compensation occurs for the mirror reflection regions of the previously obtained image.

20. The optical information reader of claim 18, wherein when a region having luminous intensity higher than a mirror reflection luminous intensity discriminating value exists in an image read by said image reader, said mirror reflection discriminating mechanism discriminates that the mirror reflection region exists.

21. The optical information reader of claim 18, further comprising an information accuracy discriminating mechanism for allowing a process of said information reading mechanism to be repeated to the same display pattern and for discriminating that information is real information of said display pattern when the information having the same content is obtained at least a reference number of times.

* * * * *